United States Patent [19]

Johnson

[11] 4,022,100

[45] May 10, 1977

[54] FASTENER

[76] Inventor: Kenneth C. Johnson, 17 Wellington Drive, Stony Brook, N.Y. 11790

[22] Filed: Aug. 13, 1975

[21] Appl. No.: 604,443

[52] U.S. Cl. .................................... 85/83; 85/84
[51] Int. Cl.² ........................................ F16B 13/04
[58] Field of Search ............... 85/83, 84, 72, 82

[56] References Cited

UNITED STATES PATENTS

| | | | |
|---|---|---|---|
| 1,057,975 | 4/1913 | Newhall et al. | 85/83 |
| 2,058,338 | 10/1936 | Meissner | 85/84 |
| 3,188,905 | 6/1965 | Millet | 85/84 |
| 3,213,745 | 10/1965 | Dwyer | 85/83 X |
| 3,431,813 | 3/1969 | Johnson | 85/83 |

FOREIGN PATENTS OR APPLICATIONS 1,166,262  10/1969  United Kingdom ............... 85/84

*Primary Examiner*—Roy D. Frazier
*Assistant Examiner*—Rodney H. Bonck

[57] ABSTRACT

The present invention is directed to an improved fastener for a hollow wall.

5 Claims, 7 Drawing Figures

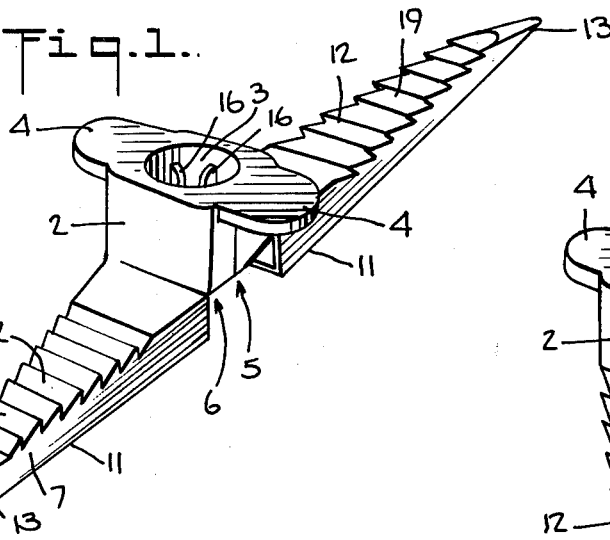
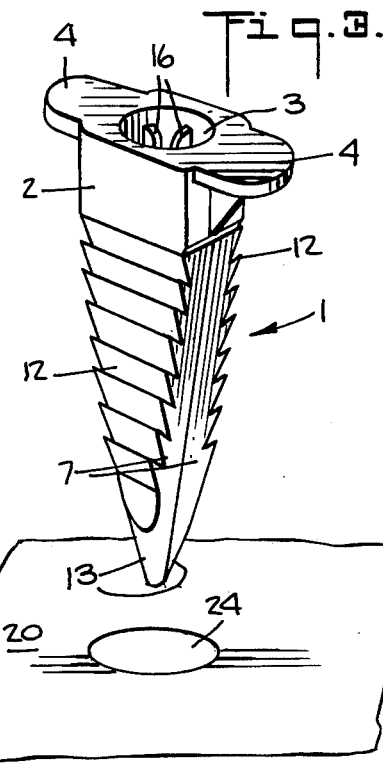
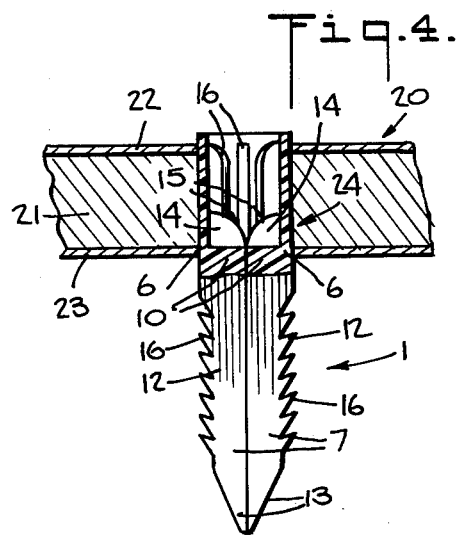
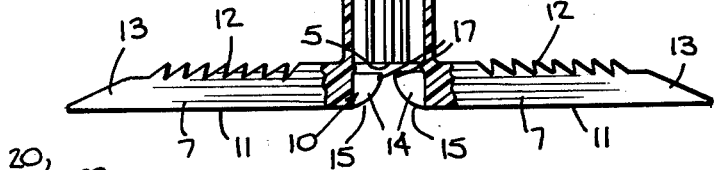
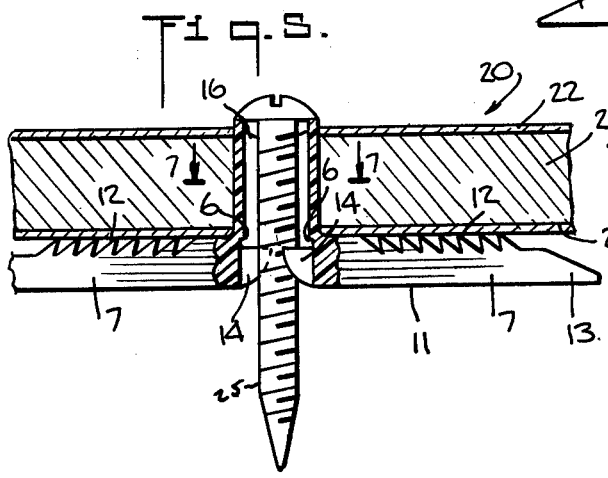
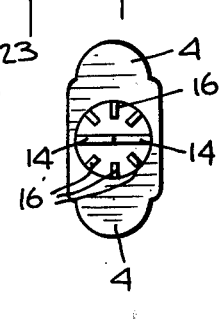
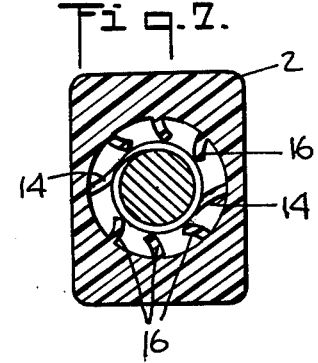

FASTENER

CROSS REFERENCE

This is an improvement over U.S. Pat. No. 3,431,813.

DESCRIPTION

The present invention relates to a wall fastener and more particularly to a hollow wall fastener adapted to be inserted into a hollow wall for holding articles and the like.

A number of fasteners have been used in the past for securing or suspending articles in hollow walls, such as, for example, plasterboard walls. In view of the thinness of such hollow walls it has been necessary to provide a mechanism for gripping the inner side surface of the wall in order to permit the fastener to be held in place.

The fastener shown and described in said U.S. Pat. No. 3,431,813 provides a fastener which has a body portion with an opening therethrough and at least two legs extending therefrom. The legs are folded together and the fastener is inserted into an opening in the body portion so that it contacts the legs and spreads them apart and causes them to bear against the inner surface of the wall.

The present invention is an improvement over said fastener and has for one of its objects the provisions of an improved fastener for use in hollow walls.

Another object of the present invention is the provision of an improved hollow wall fastener which may be molded from plastic without requiring any special machinery.

Another object of the present invention is the provision of an improved fastener which may be used with any size screw or nail and which may be provided with a self-tapping hole.

Another object of the present invention is the provision of an improved fastener which can be easily used by an inexperienced person.

Another object of the present invention is the provision of an improved fastener which has a means to give a better hinging action to hold the fastener in place.

Another object of the present invention is the provision of an improved fastener which can be applied without rotation thereof.

Another object of the present invention is the provision of a hollow wall fastener which has a longer life than existing fasteners.

Another object of the present invention is the provision of an improved fastener which will resist any attempt to withdraw it from hollow walls.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a perspective view of a hollow wall fastener made in accordance with the present invention;

FIG. 2 is a partial sectional view thereof;

FIG. 3 is an exploded view showing the hollow wall fastener immediately before it is inserted into an opening in a wall;

FIG. 4 is a sectional view showing the position of the fastener after it is inserted into the wall;

FIG. 5 is a sectional view showing the position of the fastener after a serrated member has been inserted therein;

FIG. 6 is a top view of the fastener; and

FIG. 7 is a sectional view taken along line 7—7 of FIG. 5.

Referring more particularly to the drawings, the hollow wall fastener 1 of the present invention comprises a body portion 2 having an opening 3 therein.

The body portion 2 has thin flanges 4 extending from its upper surface to act as a stop to prevent the entire fastener from being inserted into an opening 24 in a hollow wall 20. The body portion 2 is preferably non-circular to prevent it from rotating.

The body portion 2 has a lower surface 5 opposite flange 4 and extending from each corner 6 of the lower surface 5 is a gripping leg 7. Each gripping leg 7 is provided with a top wall 10, inner walls 11, outer gripping wall 12 and lower inwardly tapered portion 13. The top wall 10 is provided with a thin substantially centrally located abutting or striking flange 14 having an inner curved corner 15 and the outer wall 12 is provided with a plurality of gripping teeth 19.

The fastener is preferably made of polypropylene so that the hinge 6 can be bent any number of times without danger of breakage. However, the fastener may be made of other materials, such as metal. The thickness of each leg 7 is preferably about one half of the width of the body portion 2 so that when both legs 7 are folded, as shown in FIGS. 3 and 4, the outer edges of the body portion 2 and the outer walls 12 of the legs 7 will be substantially contiguous with each other.

The opening 3 is provided with a plurality of thin retaining ribs 16 extending radially inwardly. These retaining ribs 16 are adapted to permit the opening 3 to accommodate threaded members such as screws or bolts of different sizes. It will thus be seen that with this construction, the same fastener may be used for different size screws or bolts. This will give the fastener much greater flexibility in its uses.

The fastener is adapted to be inserted in a hollow wall 20, as shown in FIGS. 3 and 4, which may be made out of plasterboard material and which comprises an inner plaster body 21 interposed between outer and inner sheets of paperboard material 22 and 23. A hole 24 is formed in the hollow wall 20 and the hollow wall fastener 1 is inserted into the hole 24, as shown in FIGS. 3 and 4 so that the legs extend through and beyond the inner sheet 23 of the wall 20. The opening 24 may be a small opening, made by a nail or the like, and the fastener may be hammered into the small opening so that the fastener makes its own snugly fitting opening. The fact that the fastener is not circular will prevent the fastener from spinning.

A serrated member 25, such as a screw or bolt, is then inserted into the opening. As shown in FIG. 7, when the serrated member is inserted in the opening 3, the holding ribs or ridges 16 will be bent around the threaded fastener to hold it in a steady position. Depending upon the diameter of the threaded fastener, the ribs 16 will be flexed a greater or lesser amount. However, even with a very thin threaded fastener, the ribs will hold it in place.

The forward portion of the screw 25 strikes the inner corner 15 of the flange 14 to spread legs 7 apart. The force of the serrated member upon the corners 15 causes the legs 7 to spread apart. The force of the legs on the plaster body 21 enables the legs 7 to become firmly engaged therewith as shown in FIG. 5. The outer corners 17 engage and mesh with the serrations in the serrated member 25 to hold it in place. The holding power of this improvement is between 25% to 30% greater.

The teeth 19 permit the legs to bite into the wall 20 and securely hold the fastener 1 in place. The screw 25 will maintain pressure against the legs 7 through outer corners 17 so that the legs are securely anchored to the wall 20.

The fact that the threaded member strikes the flanges 14 permits the legs to be spread outwardly immediately and with much greater force and causes the legs to tightly impinge themselves against the inner portions of the hollow wall. The force of the flanges on the threaded member will resist any strong force tending to pull the threaded member away from the fastener. This is particularly so since the points 17 of the flanges 14 tends to hook into the threads of the threaded member to hold the threaded member securely in place. As will be seen in FIG. 5, the flanges wrap themselves around threaded member 25 and the straight portions 17 hook into the threads to hold the legs spread apart even with spreading members of different sizes.

It will be seen that the present invention provides an improved hollow fastener which has longer life, will not break and which may be molded from a plastic and inexpensively produced. Furthermore, the invention provides a hollow fastener which resists any attempt to withdraw it, which may be used with a screw of any size and which has a self-tapping hole so that an inexperienced person can easily use it.

It will be obvious from the above description as well as from said earlier U.S. Pat. No. 3,431,813 that the fastener can be easily removed without destroying the wall and that the legs of the fastener will fold back to the insertion position when the screw is removed.

As many and varied modifications of the subject matter of this invention will become apparent to those skilled in the art from the detailed description given hereinabove, it will be understood that the present invention is limited only as provided in the claims appended hereto.

Having thus described the invention, it is claimed:

1. A fastener comprising a body portion having an opening therethrough having an axis, an upper surface and a lower surface, the lower surface of the body portion having a pair of opposed outer corners, a gripping leg extending from each of the opposed outer corners, each gripping leg comprising an outer corner and an upper surface extending substantially perpendicular relative to said axis adapted to underlie and abut the lower surface of said body portion, the upper surface of each leg having side corners substantially normal to said outer corner, the outer corner of said gripping leg being integral with and pivotally mounted to said lower surface of said body portion whereby insertion of a threaded spreading member through the opening in the body portion will cause said legs to spread apart to permit the legs to grip a wall, means in said opening to permit spreading members of different sizes to be inserted therein, said means comprising a plurality of resilient ribs in said opening substantially parallel to each other, a resilient striking flange extending upwardly from and centrally located on the upper surface of each leg, each striking flange being a thin flange equidistantly spaced inwardly from each side corner, each of said flanges having flat sides at right angles to the said upper surface, each of said flanges having a first straight edge at right angle to the upper surface and a second edge adjacent said first edge extending upwardly and inwardly connecting the first edge with the upper surface, upon insertion said spreading member initially striking the said second edge of the flanges to move the legs outwardly and thereafter striking the straight edge of the flanges with the said flanges wrapped around the spreading member and the said straight edge of the flanges hooked onto the threads of the spreading member to keep the legs in their spread apart position, whereby said fastener is adapted to accommodate threaded member of different sizes and whereby insertion of threaded members of different thicknesses will spread said legs substantially the same distances apart.

2. A fastener as claimed in claim 1, wherein the thickness of each leg is substantially equal to about one half of the width of said body portion.

3. A fastener as claimed in claim 2, wherein said body portion is non-circular.

4. A fastener as claimed in claim 3, wherein said body portion is rectangular.

5. A fastener as claimed in claim 4, wherein each leg is provided with gripping teeth on its outer surface.

* * * * *